Patented Apr. 27, 1948

2,440,494

UNITED STATES PATENT OFFICE 2,440,494

LOW-TEMPERATURE POLYMERIZATION OF BUTADIENE IN THE PRESENCE OF METHALLYL CHLORIDE

William J. Sparks, Elizabeth, and Robert M. Thomas, Union, N. J., assignors to Standard Oil Development Company, a corporation of Delaware No Drawing. Application October 11, 1941, Serial No. 414,596

4 Claims. (Cl. 260—93)

This invention relates to olefinic polymers; relates particularly to low temperature polyolefinic polymers; and relates especially to low temperature polyolefinic polymers which are soluble in naphthas and can be deposited on surfaces as clear, adherent films and which are reactive with sulfur to produce relatively hard, tough and non-brittle polymers.

Various of the diolefins have been polymerized by various processes such as simple heating of the diolefins, or by heating in the presence of certain catalysts of which metallic sodium has been the most successful; or by polymerization in emulsion at room temperature in the presence of peroxide catalysts. These polymerization processes yield plastic, elastic polymers which have many of the characteristics of natural rubber, including the property of vulcanizability, relatively high elongation, and a good tensile strength at break after vulcanization; but these polymers when cured with rather large quantities of sulfur, as is done with natural rubber, do not yield satisfactory substitutes for hard rubber.

Also, the diolefins alone, such as butadiene, have been polymerized by a low temperature process at temperatures ranging from 0° C. down to —100° C. by the application of Friedel-Crafts type catalysts, such as aluminum chloride dissolved in ethyl or methyl chloride; but the resulting diolefin polymers are powders of very low solubility which are relatively infusible, as well as insoluble, and have poor thermoplastic properties. Likewise, various of the diolefins, particularly those obtained from petroleum cracking, have been polymerized into the so-called "Thomas and Hochwalt" resins, which while thermoplastic, are brittle, hard resins of relatively low solubility and low tensile strength.

The present invention provides a new polymerizing process, applicable to polyolefins, by which new, high molecular weight polymers are obtained having good thermoplasticity, which are capable of combining with sulfur to yield tough, hard materials having many characteristics closely similar to those of "hard rubbers" as prepared from natural rubber, but with a greater toughness, strength and elasticity, and much less brittleness. These polymers also are soluble in naphthas and other organic solvents and when applied as a film, especially from volatile solvents, may combine with atmospheric oxygen in a "drying" reaction to yield a high grade surface coating of the type of clear lacquers or varnishes. The process of this invention consists in the polymerization of a diolefin such as butadiene by the application thereto at a temperature below about —50° C. to about —150 but preferably at —78° C., of a Friedel-Crafts type catalyst such as aluminum chloride dissolved in a low-freezing, inert, solvent such as ethyl chloride in the presence of a polymerization modifier to alter the character of the polymers produced. This modifier may be a diluent or it may be a modifying material present in small quantities; such as methallyl chloride or crotonyl chloride, an isopropenyl chloride, a propargyl chloride, or nitrogen compounds such as ammonia, amines, and nitro compounds, or any organic sulfur compound such as ethyl mercaptan or other mercaptans, sulfides and the like, or an organic oxygenated compound such as acetone, methyl alcohol, ethyl ether; or it may be a simple diluent. For this purpose, there may also be used any of the hydrocarbons which are liquids at ordinary temperature such as the petroleum ethers and the like which also have the desired modifying effect upon the polymer reaction.

It appears that the rubbery polymers of the prior art show the high elongation characteristics because of the existence of the molecules in the form of long chains of carbon atoms which have very high molecular weights with little or no cross linkage between the chains. By the reaction with sulfur a small, controlled amount of cross linking can be introduced. It further appears that the hard brittle resins are those in which a large amount of cross linking occurs between chain type polymers of lower molecular weight. It also appears that the powdered polymer obtained from a diolefin by the ordinary low temperature technique has a large amount of cross linkage between the linear chain molecules; such cross linkage preventing the slippage between molecules which appears to be the cause of the elasticity and elongation of the rubbery polymers. The cross linkage also leads to low solubility and low fusibility because of the modification in the character of the molecule.

It is considered that the process of the present invention, by the use of a poison or diluent for the polymerization reaction such as acetaldehyde, methallyl chloride, acetone, ethyl ether or the like greatly reduces the cross linkage which otherwise occurs in the polymer product. In the low temperature polymerization the partial prevention of cross linking yields a polymer which has more cross linking than is obtainable in the low temperature interpolymers of isobutylene with butadiene, but at the same time has much less cross linking than the ordinary insoluble polymers of butadiene.

Thus an object of the invention is to polymerize a diolefin by a low temperature technique, including the application of a dissolved Friedel-Crafts type catalyst in the presence of a mild poison for the polymerization reaction in order to modify the physical and chemical characteristics of the polymers obtained, and to yield a less brittle polymer which is reactive with sulfur in varying proportions to yield a tough, strong, slightly elastic solid polymer, having a molecular weight ranging between about 5,000 and about 40,000. Other objects and details of the invention will be apparent from the following description.

In practicing the invention a diolefin such as butadiene or isoprene, or pentadiene-1,3 or dimethylbutadiene, or the like is cooled to temperatures ranging from $-40°$ C. or $-50°$ C. to temperatures as low as $-100°$ C. or $-150°$ C., preferably to $-78°$ C. as set at the temperature of solid carbon dioxide, in the presence of substantial quantity, ranging from a trace up to as high as 100 parts of the modifier per 100 parts of the diolefin of a poison for the polymerization reaction, such as methallyl chloride or the like. The quantity of the reaction modifier or poison or diluent to be used depends upon the character or polymer desired, that is, the amount of cross linking needed to give the desired character of product; and also upon the modifying power or poisoning properties of the modifier compound. The polymerization reaction is then conducted by the application of a dissolved, Friedel-Crafts type catalyst such as aluminum chloride, aluminum bromide, titanium tetrachloride, boron trifluoride, uranium chloride and the like, dissolved in a low-freezing, inert or non-complex forming solvent such as ethyl or methyl chloride or carbon disulfide or the like. The catalyst solution preferably contains from 0.1% to 5% of the dissolved active metal halide catalyst and is preferably used in the ratio of about 10 parts per 100 parts of the diolefin. The polymerization proceeds promptly with the development of a substantial amount of heat and the production of a polymer in the form of substantial sized solid particles having a soft, somewhat sticky character. This polymer is reactive with sulfur in varying proportions, ranging from 3 parts per 100 parts of polymer to 10 parts of sulfur per 100 of polymer to produce a hard, tough, elastic, non-brittle, cured resin.

Example I

A mixture was prepared consisting of 50 parts by volume of butadiene and 50 parts by volume of methallyl chloride. This mixture was cooled to $-78°$ C. by the addition of a substantial quantity of solid carbon dioxide (powdered "Dry Ice"). Twenty parts of a 5% solution of aluminum chloride in ethyl chloride were added slowly to the rapidly stirred reactant mixture. The reaction occurred rapidly and a solid, rather soft, plastic, polymer was obtained. This polymer was found to be readily soluble in hydrocarbons such as benzene, petroleum ether, naphtha, gasoline, lubricating oil or the heavier greases.

A sample of the polymer was purified by dissolving it in benzene and washing the solution repeatedly with alkali in solution and then precipitating the polymer from the benzene solution by the addition of alcohol. Upon analysis of the purified polymer it was found to be free from chlorine, thereby showing that none of the methallyl chloride had interpolymerized.

Example II

Butadiene in the absence of methallyl chloride was cooled to $-78°$ C. by the addition of solid carbon dioxide and 20 parts of a 5% solution of aluminum chloride in ethyl chloride per 100 parts of butadiene were added to the cooled diolefin. A rapid reaction occurred as in Example I, but the resultant polymer was an insoluble, hard brittle, powder which could not be dissolved in hydrocarbon solvents.

Example III

The polymer obtained in Example I was compounded according to the following formula:

| | Parts |
|---|---|
| Soluble polymer | 100 |
| Carbon black | 50 |
| Sulfur | 24 |
| Zinc oxide | 20 |
| Tuads (tetramethyl thiuram disulfide) | 8 |

The polymer was worked on the mill briefly until it had reached the temperature of about 55° C. and then the carbon black, sulfur and zinc oxide were added while further working the mass on the mill. When the other components were thoroughly incorporated, Tuads was added and worked in rapidly on the cooled mill. The compound was placed in a mold and cured at a temperature of 155° C. for 60 minutes to yield a tough, non-brittle, strong, solid polymer article. This product resembled hard rubber in many ways, but was superior to hard rubber in toughness and lacked the brittleness characteristic of hard rubber.

Example IV

One volume of butadiene was dissolved in 2 volumes of petroleum ether. The mixture was cooled internally by the addition of solid carbon dioxide. When the solution was cooled to approximately $-78°$ C., a polymerization catalyst consisting of a 0.5% solution of aluminum chloride in methyl chloride was added slowly to the rapidly stirred, cooled, butadiene solution. The soluble polymer product was then precipitated by the addition of isopropyl alcohol, and the petroleum ether and alcohol were filtered from the precipitated polymer. The solid polymer was dried to remove all traces of the petroleum naphtha, alcohol, and the methyl chloride, and the dried polymer was redissolved in 54° naphtha. The resulting solution was a clear, water-white solution of a good viscosity. It was applied to a glass surface, and the naphtha allowed to evaporate. The polymer formed a clear, water-white coating which yielded a tough, transparent and a highly desirable lacquer.

Example V

A mixture of 50 parts of isoprene with 50 parts crotonyl chloride was cooled to $-78°$ C. by solid carbon dioxide, as in Example I. A like quantity of catalyst solution like that of Example I was added and a similar solid polymer was obtained.

This polymer likewise was soluble in hydrocarbon solvents and upon analysis as in Example I, it likewise was found to be free from chlorine, indicating that none of the crotonyl chloride had interpolymerized. This polymer was also compounded according to the formula in Example III and a similar, tough, non-brittle flexible product was obtained.

Example VI

A mixture was prepared consisting of 50 parts by volume of pentadiene-1,3 and 50 parts by volume of methallyl chloride. This mixture was cooled to −78° C. by the addition of a substantial quantity of solid carbon dioxide (powdered "Dry Ice"). Twenty parts of a 5% solution of aluminum chloride in ethyl chloride were added slowly to the rapidly stirred reactant mixture. The reaction occurred rapidly and a solid, rather soft, plastic polymer was obtained. This polymer was found to be readily soluble in hydrocarbons such as benzene, petroleum ether, naphtha, gasoline, or lubricating oil.

A sample of the polymer was purified by dissolving it in benzene and washing the solution repeatedly with alkali in solution and then precipitating the polymer from the benzene solution by the addition of alcohol. Upon analysis of the purified polymer it was found to be free from chlorine, thereby showing that none of the methallyl chloride had interpolymerized.

Example VII

A mixture of 50 parts by volume of dimethyl butadiene was prepared with 0.1 part of benzyl mercaptan, and the mixture was cooled to −78° C. by the addition of a substantial quantity of solid carbon dioxide. 20 parts of a 5% solution of aluminum chloride dissolved in ethyl chloride were added slowly to the rapidly stirred reactant mixture. The polymerization occurred rapidly, and a solid, somewhat soft, plastic, polymer was obtained. This polymer was found to be readily soluble in hydrocarbons, insoluble in oxygenated solvents such as the alcohols and ethers, and was found to be readily reactive with sulfur to produce a tough, durable, non-brittle thermoplastic resin.

All of these several polymers were found to be readily soluble in the volatile hydrocarbons to yield solutions of moderate viscosity and substantial solid content suitable for application in a covering film either by the use of an ordinary paint brush or by the use of a spray. Upon evaporation of the volatile hydrocarbon solvent, there was left a thin, tough, durable film, which upon drying hardened to a high grade protective surface coating. The solution preferably contained from 10 to 30% of solid polymer in the hydrocarbon solvent, and may contain in addition any of the usual paint pigments or colorants, including such pigments as white lead, lithopone, barites, chrome green and chrome yellow, rouge, the various lakes and the like, or may be colored by appropriate oil soluble dyes. The polymer material may be used as the only film forming material, or it may contain in addition other of the standard film forming substances which are soluble in petroleum hydrocarbon solvents, including various of the synthetic polymers such as Bakelite (phenol-formaldehyde condensation resin), or linseed oil, or gum dammar, and the like, in various proportions according to the solvent used and the compatibility of the various solids and solvents. The polymer is not limited to application for surface coatings; but in reaction with sulfur it may be used for a wide range of articles such as molded objects and the like.

The polymer was compounded according to the following formula:

| | Parts |
|---|---|
| Soluble polymer | 100 |
| Carbon black | 50 |
| Sulfur | 24 |
| Zinc oxide | 20 |
| Tuads (tetramethyl thiuram disulfide) | 8 |

The polymer was worked on the mill briefly until it had reached the temperature of about 55° C. and then the carbon black, sulfur and zinc oxide were added while further working the mass on the mill. When the other components were thoroughly incorporated, Tuads was added and worked in rapidly on the cooled mill. The compound was placed in a mold and cured at a temperature of 155° C. for 60 minutes to yield a tough, non-brittle, strong, solid polymer article. This product resembled hard rubber in many ways, but was superior to hard rubber in toughness and lacked the brittleness characteristic of hard rubber.

Example VIII

A mixture was prepared consisting of 50 parts by volume of dimethyl butadiene and 50 parts by volume of methallyl chloride. This mixture was cooled to −78° C. by the addition of a substantial quantity of solid carbon dioxide (powdered "Dry Ice"). Twenty parts of a 5% solution of aluminum chloride in ethyl chloride were added slowly to the rapidly stirred reactant mixture. The reaction occurred rapidly and a solid, rather soft, plastic polymer was obtained. This polymer was found to be readily soluble in hydrocarbons such as benzene, petroleum ether, naphtha, gasoline or lubricating oil.

A sample of the polymer was purified by dissolving it in benzene and washing the solution repeatedly with alkali in solution and then precipitating the polymer from the benzene solution by the addition of alcohol. Upon analysis of the purified polymer it was found to be free from chlorine, thereby showing that none of the metallyl chloride had interpolymerized.

The polymer was compounded according to the following formula:

| | Parts |
|---|---|
| Soluble polymer | 100 |
| Carbon black | 50 |
| Sulfur | 24 |
| Zinc oxide | 20 |
| Tuads (tetramethyl thiuram disulfide) | 8 |

The polymer was worked on the mill briefly until it had reached the temperature of about 55° C. and then the carbon black, sulfur and zinc oxide were added while further working the mass on the mill. When the other components were thoroughly incorporated, Tuads was added and worked in rapidly on the cooled mill. The compound was placed in a mold and cured at a temperature of 155° C. for 60 minutes to yield a tough, non-brittle, strong, solid polymer article. This product resembled hard rubber in many ways, but was superior to hard rubber in toughness and lacked the brittleness characteristic of hard rubber.

As above pointed out, the polymer of this invention combines advantageously with sulfur to yield a material which is in some respects analogous to hard rubber in that it is a relatively hard, moldable, resin-like substance. It is, however, free from the brittleness which is characteristic of hard rubber and it has a certain amount of flexibility which is unique to materials of this type. Also it shows a high strength, both tensile strength and compression strength; and is substantially non-brittle, showing little tendency towards the conchoidal type of fracture which is characteristic of most of the resins and molding compositions. The material may be compounded with a wide range of fillers in much the same manner in which molding compositions generally are compounded. Suitable fillers include lamp black, lithopone, barytes, rouge, chrome green, and the other inert non-organic fillers. Similar suitable organic fillers are found in wood flour, fibers in any form including paper, the wool and silk fibers if desired, pure cork and the like. The material may be colored a wide range of colors by the inclusion in the composition of pigments generally including white lead, chrome yellow, substantially any of the colored lakes and the like, or the material may be colored by dye stuffs generally, especially the oil soluble dyes.

As above pointed out, the material, before curing, is thermoplastic on a curing operation which may be conducted in molds; and the material caused to set up into an infusible resin which is highly desirable and advantageous for many uses.

Likewise the material is reactive with oxygen either atmospheric oxygen or oxygenating agents. It is conveniently soluble in the various hydrocarbon solvents, to yield a high grade drying lacquer or varnish.

The lower molecular materials, in which the major characteristic is very thick, very viscous oil, may be utilized in much the same way in which natural drying oils are used.

The higher molecular weight materials are more nearly of the type of drying resins. Either form, when dissolved in volatile solvent, is highly useful in the preparation of surface covering coatings.

The simple solution of the resin in a volatile solvent may be applied to a surface to be protected to produce thereon a clear lacquer film which upon drying yields a high grade varnish or lacquer.

Alternately, any of the usual paint pigments may be added to the solution in volatile solvent, to produce high grade, durable, paints. Either the lacquer or the paints may be colored by the incorporation thereinto of substantially any of the lake colors, or by the use of the usual dyes, particularly the oil soluble dye substances.

Thus the process of the invention polymerizes the polyolefins; preferably a conjugated diolefin at a low temperature by the application to the diolefin of a dissolved Friedel-Crafts type catalyst in the presence of a mild poison for the polymerization reaction, or a diluent, for modifying the polymerization reaction to produce high molecular weight polymers having molecular weights usually greater than 5,000 which are reactive with sulfur and oxygen to yield tough, non-brittle substances particularly suitable for molding compositions and surface coatings.

While there are above disclosed but a limited number of embodiments of the invention, it is possible to produce still other embodiments without departing from the inventive concept herein disclosed, and it is, therefore, desired that only such limitations be imposed upon the appended claims as are stated therein or required by the prior art.

The invention claimed is:

1. A low temperature polymerization process for butadiene comprising the steps in combination of mixing butadiene with methallyl chloride, cooling the mixture to a temperature below 0° C., and applying to the cooled mixture a polymerization catalyst comprising aluminum chloride dissolved in a non-complex-forming solvent having a freezing point below 0° C.

2. A low temperature polymerization process for butadiene comprising the steps in combination of mixing butadiene with methallyl chloride, cooling the mixture to a temperature below 0° C., and applying to the cooled mixture a polymerization catalyst comprising aluminum chloride dissolved in a non-complex-forming solvent having a freezing point below 0° C., comprising ethyl chloride.

3. A low temperature polymerization process for butadiene comprising the steps in combination of mixing butadiene with methallyl chloride, cooling the mixture to a temperature below 0° C., and applying to the cooled mixture a polymerization catalyst comprising aluminum chloride dissolved in a non-complex-forming solvent having a freezing point below 0° C., comprising methyl chloride.

4. A low temperature polymerization process for butadiene comprising the steps in combination of mixing butadiene with methallyl chloride, cooling the mixture to a temperature below 0° C., and applying to the cooled mixture a polymerization catalyst comprising aluminum chloride dissolved in a non-complex-forming solvent having a freezing point below 0° C., comprising carbon disulfide.

WILLIAM J. SPARKS.
ROBERT M. THOMAS.

REFERENCES CITED

The following references are of record in the file of this patent:

UNITED STATES PATENTS

| Number | Name | Date |
|---|---|---|
| 1,882,976 | Schmidt | Oct. 18, 1932 |
| 2,039,364 | Thomas et al. | May 5, 1936 |
| 2,092,295 | Van Peski | Sept. 7, 1937 |
| 2,273,158 | Thomas et al. | Feb. 17, 1942 |
| 2,344,213 | Otto | Mar. 14, 1944 |

FOREIGN PATENTS

| Number | Country | Date |
|---|---|---|
| 6,642 | Great Britain | June 21, 1911 |
| 338,152 | Great Britain | Nov. 14, 1930 |
| 492,998 | Great Britain | Sept. 30, 1938 |
| 500,769 | Great Britain | Feb. 15, 1939 |